Oct. 19, 1971   D. C. HUGHES   3,613,278
DISPLAY ADVANCE MECHANISM
Filed Jan. 2, 1970
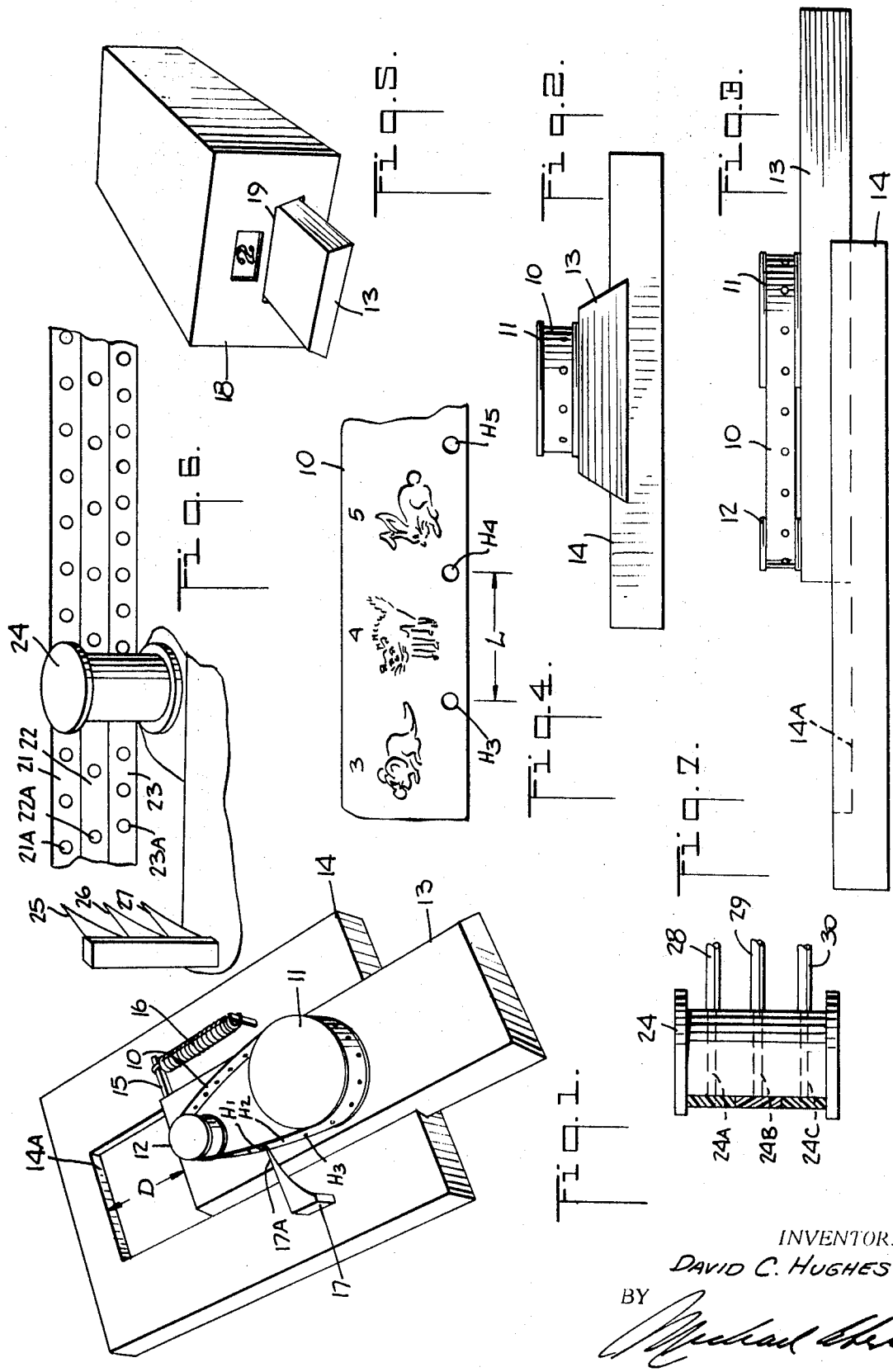
INVENTOR.
DAVID C. HUGHES
BY
ATTORNEY

United States Patent Office 3,613,278
Patented Oct. 19, 1971

3,613,278
DISPLAY ADVANCE MECHANISM
David C. Hughes, White Plains, N.Y., assignor to Child Guidance Toys Inc., Bronx, N.Y.
Filed Jan. 2, 1970, Ser. No. 95
Int. Cl. G09f *11/26*
U.S. Cl. 40—96
7 Claims

ABSTRACT OF THE DISCLOSURE

A display device in which numbers or other data to be presented appear sequentially along a movable endless tape supported between spaced guides mounted on a carriage, the tape having a continuous series of equi-spaced sprocket holes formed therein. The carriage is slidable with respect to a bed having a claw fixedly mounted thereon, the tip of the claw being adapted to enter said holes during the forward and reverse stroke of said carriage, but to effect engagement therewith only during the reverse stroke. The carriage is spring-biased normally to assume a fully extended position relative to said bed, at which position the tip is admitted into one of said holes. When the carriage is pushed in against the action of the spring by a distance which is greater than the spacing between successive holes but less than twice the spacing, the tip then enters and passes over the next hole during the forward stroke without entering the succeeding hole, and when the carriage is thereafter released, the tip re-enters and engages said next hole to cause an incremental advance of the tape until the carriage again assumes its fully extended position.

BACKGROUND OF INVENTION

This invention relates generally to devices for sequentially changing a display by a simple linear motion, and in particular to a mechanism for indexing an endless tape having display data printed thereon.

Display devices are known, such as those disclosed in the prior U.S. patent to Alford et al. 3,201,882, and Bessler 2,249,879 in which endless tapes or loops are incrementally advanced by means of elements adapted to engage sprocket holes or hooks carried on the tape. In such known devices, the tapes or loops are movable on guides mounted on a stationary support, whereas the indexing mechanism is constituted by levers, cranks or other movable components.

Existing devices of the above type are relatively complex and costly, and have a limited capability. If, for example, two or more tapes are to be concurrently indexed, with each tape advancing a different distance in response to an indexing operation, the indexing mechanism for this purpose is quite elaborate and is expensive to construct.

SUMMARY OF INVENTION

In view of the foregoing, it is the main object of this invention to provide a display device for sequentially changing the presentation of data by a simple linear motion. By "data" is meant numbers, letters, pictures or any other form of useful information.

More specifically, the object of the invention is to provide a display device in which the information to be displayed appears along a movable endless tape which is indexed to present the bits of information in sequence.

Among the significant features of the invention are those of simplicity and economy of construction as well as flexibility of application. The invention lends itself to an arrangement in which a group of tapes in stacked relation may be conveniently indexed by a simple linear motion, with each tape advancing a different distance to provide permutations of information or to carry out switching actions depending on the permutations.

Briefly stated, these objects are attained in an arrangement in which the numbers or other data to be presented appear sequentially along a movable endless tape supported between spaced guides mounted on a carriage, the tape having a continuous series of sprocket holes formed therein. The carriage is slidable with respect to a bed, and is spring-biased whereby the carriage is normally fully extended away from the bed. When pushed in, the carriage travels a predetermined distance which is greater than the spacing between two successive holes on the tape and less than twice this spacing. The carriage, when thereafter released, returns to its fully extended position. Fixedly mounted on the bed is a claw whose tip is adapted to enter the sprocket holes during the forward and return strokes of the carriage but which effects engagement with the tape holes only during the return stroke. At the fully extended position of the carriage, the claw tip is admitted into one of the holes and when the carriage is pushed in, the tip then enters and passes over the next hole without entering the succeeding hole. When, however, the carriage is thereafter released, the tip re-enters said next hole to engage the tape and to cause an incremental advance thereof until the carriage again assumes its fully extended position.

OUTLINE OF DRAWING

For a better understanding of the invention, as well as other objects and features thereof, reference is made to the following detailed description to be read in conjunction with the accompanying drawing, wherein:

FIG. 1 is a perspective view of one preferred embodiment of a display mechanism in accordance with the invention, the casing therefor being omitted;

FIG. 2 is an end elevational view of the mechanism;

FIG. 3 is a side elevational view of the mechanism;

FIG. 4 shows a representative portion of the display tape;

FIG. 5 is a perspective view of the mechanism in its casing;

FIG. 6 illustrates a second embodiment of the invention in which several tapes are concurrently advanced, only the tapes and the claws associated therewith being shown; and FIG. 7 shows the guide structure of another embodiment of the invention in which the moving tapes act to carry out switching actions in a fluidic control system.

DESCRIPTION OF INVENTION

Referring now to FIGS. 1 to 5, there is shown a preferred embodiment of a display device in accordance with the invention, the device including a movable endless tape 10 supported between guides 11 and 12 mounted adjacent the front and rear ends, respectively, of a rectangular carriage 13 which is slidable on a bed 14.

Tape 10, as best seen in FIG. 4, is provided with a continuous series of equi-spaced sprocket holes $H_1$, $H_2$, $H_3$, etc., along the lower edge thereof or elsewhere along the tape. By way of example, the information to be displayed is shown as a series of animal pictures above which is an identifying numeral. It is to be understood that in practice, any useful form of data to be displayed sequentially under the control of an operator may be printed or otherwise applied along the surface of the tape. Preferably the sprocket holes are interposed between the display items so that they are not visible when an item is presented for display.

Endless tape 10 may be made of paper, plastic or other suitable flexible material having an inherent stiffness, tending to cause the tape to assume a circular form. Guides 11 and 12 are provided with top and bottom flanges and a cylindrical guide surface therebetween to maintain the loop in place and to prevent distortion thereof. Guide 11 is larger than guide 12 to provide an arcuate surface of large radius so that the data to be observed is presented on a relatively flat surface. The guides may be made of Teflon or other smooth material having a low coefficient of friction.

Bed 14 has a rectangular bay 14A cut therein. The long sides of the bay are provided with grooves whose walls are inclined to receive the sloping sides of the sliding carriage 13, the cross-sectional shape of the carriage being trapezoidal. Attached to a bracket 15 extending laterally from the rear end of carriage 13 is the free end of a helical spring 16 whose other end is anchored on bed 14. Spring 16 acts to urge carriage 13 away from bed 14 so that in its static state, the front portion of the carriage projects from the bed. This is the fully extended position of the carriage.

When carriage 13 is pushed in, spring 16 is stretched until the carriage reaches the far end of bay 14A. The distance moved by the carriage from its fully extended position to its retracted position is represented in FIG. 1 by letter D. The spacing between successive equi-spaced sprocket holes $H_1$, $H_2$, $H_3$, etc., is represented by letter L (FIG. 4).

Mounted on bed 14 on the side of the bay opposite the spring is a fixed claw 17 having a tip 17A which is positioned to enter the sprocket holes during the forward stroke of the carriage (i.e., when the carriage is pushed in) and during the return stroke (i.e., after the carriage is released and returns to its fully extended position). Claw 17 has a straight leading edge and a curved trailing edge so that when the carriage is pushed in, tip 17A enters the sprocket holes which make contact with the curved trailing edge. This edge does not arrest the tape but permits it to move with the carriage. Thus the tip, as the carriage is pushed in, though it maintains contact with the tape loop due to the springy quality of the loop material, does not engage the tape but enters the passing sprocket holes and withdraws therefrom.

The distance D travelled by the carriage is made greater than the spacing L between successive holes, but less than twice the value of L. At the fully extended position of the carriage, tip 17A is admitted into a particular hole. When, therefore, the carriage is pushed in, tip 17A will enter and pass over the very next hole and stop at some point which falls short of the following hole.

Thus in FIG. 1, tip 17A is shown in hole $H_1$ at the fully extended position of the carriage. When the carriage is pushed in all the way to traverse the distance D, the tip will ride over the very next hole $H_2$ and stop short of the following hole $H_3$. But when the carriage is released, the tip will now again enter the very next hole $H_2$. However, since it now presents its straight leading edge to the tape, it will engage the tape, and as the carriage continues to move toward its fully extended position, the tape will be shifted along guides 11 and 12 to bring a new item in front of guide 11.

As shown in FIG. 5, the mechanism is enclosed in a box-like casing 18 having a slot 19 therein to accommodate the extension of the carriage and a window 20 to expose only that portion of the tape 10 running over the front of guide 11. Thus, each time carriage 13 is pushed in and released, a fresh item is presented at the window. In one simple application, the device may act as a counter, with numbers presented in sequence as the carriage is actuated. The tape capacity may be doubled by introducing a half twist therein so that both sides of the loop are presented in the course of an operating cycle.

As shown in FIG. 6, the loop and claw arrangement may be multiplied to provide information permutations. This is done by the use of guides adapted to accommodate three tapes 21, 22 and 23. These tapes are disposed one above the other on a guide 24 whose height is appropriate to the stacked tapes. Guide 24 has the same function as guide 12 in FIG. 1. Another guide (not shown) is provided to support the other end of the tape loops.

Operating in conjunction with the three tapes is a triple deck claw 25, 26 and 27, fixedly mounted on bed 14. The tips of these claws are adapted to enter the respective sprocket holes 21A, 22A and 23A of the tapes. The sprocket holes on the three tapes are equi-spaced; however, each tape has a different hole spacing. This makes possible various permutations of information.

Taking a simple example involving only two tapes, we shall assume that one tape has ten holes in conjunction with ten pictures, and the other has eleven holes and eleven pictures. In both cases, the spacing between holes must be less than the slide distance D, but greater than one-half D. Then when the carriage is actuated, each tape will be indexed, but since one tape has ten positions and the other eleven, a different combination thereof will appear for each actuation, the total number of permutations being one hundred and ten.

The loops may be made of translucent film material and an illuminated optical projector associated therewith whereby the pictures or numbers on the tape may be projected onto a screen or other surface.

The display device is also useable as a switching or logic element in fluidic systems. A general description of fluidic systems as well as fluidic logic and control elements may be found in the article entitled "Fluidics—A New Control Tool," appearing the the November 1969 issue of Spectrum (IEEE). As shown in FIG. 7, guide 24 is provided with three fluid ducts 24A, 24B, and 24C, which register with the sprocket holes on the tape passing over the guide. The ducts are coupled to fluid lines 28, 29 and 30. These lines are opened or blocked depending on whether the sprocket holes on the associated tapes are in or out of registration with the ducts. Thus, with each advance of the tapes, a different combination of holes is presented to carry out various logic functions.

While there has been disclosed preferred embodiments of the invention, it is to be understood that many changes may be made therein without departure from the essential spirit of the invention. Thus, while the window for the tape is shown as facing the front tape guide, the window may be placed at another position to facilitate viewing of the tape.

I claim:

1. A display device for sequentially changing display data by a simple linear motion, said device comprising:
   (a) a bed,
   (b) a carriage slidable on said bed from a fully extended position in which the front portion of the carriage projects beyond the bed to a fully retracted position which is a predetermined distance from the fully extended position,
   c) spring means normally to maintain said carriage in said fully extended position, and when said carriage is pushed in toward said fully retracted position and thereafter released, to return said carriage to said fully extended position,
   (d) a continuous tape movably supported between two guides mounted on said carriage adjacent the front and rear ends thereof, said tape having a continuous series of equi-spaced sprocket holes thereon, and
   (e) a claw fixedly mounted on said bed, said claw having a tip in registration with said holes, said predetermined distance being greater than the spacing between successive holes but less than twice the spacing, the shape of said claw being such as to effect engagement with said holes only when the carriage is returning to said fully extended position, whereby the tape is incrementally advanced each time the carriage is pushed in and released.

2. A device as set forth in claim 1 wherein the guide adjacent the front end is of relatively large diameter.

3. A device as set forth in claim 1 wherein said bed has a bay formed therein to accommodate the sliding carriage.

4. A device as set forth in claim 1 wherein said tape has data thereon adjacent each hole.

5. A device as set forth in claim 4 wherein said bed and carriage are enclosed in a casing having an opening to accommodate the projecting portion of the carriage and a window to display the data presented on said tape.

6. A device as set forth in claim 1 including a second continuous tape mounted on said guides above said first tape, said second tape having equi-spaced sprocket holes thereon whose spacing differs from that of the first tape, and a second claw mounted above the first claw to engage said second tape, whereby actuation of said carriage effects a concurrent advance of both tapes.

7. A device as set forth in claim 6, further including fluidic lines coupled to ducts formed in one of said guides in line with the sprocket holes in said tapes to effect fluidic switching actions as said holes in the advancing tapes fall in and out of registration with said ducts.

References Cited

UNITED STATES PATENTS

| 2,249,879 | 7/1941 | Bessler | 40—96 |
| 2,807,191 | 9/1957 | Flora | 40—96 |

ROBERT W. MICHELL, Primary Examiner

J. H. WOLFF, Assistant Examiner

U.S. Cl. X.R.

40—48